(12) United States Patent
Lee

(10) Patent No.: US 7,232,058 B2
(45) Date of Patent: Jun. 19, 2007

(54) DATA DISPLAYING APPARATUS AND METHOD

(75) Inventor: Kwang-Bok Lee, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/931,920

(22) Filed: Sep. 1, 2004

(65) Prior Publication Data

US 2005/0194432 A1      Sep. 8, 2005

(30) Foreign Application Priority Data

Mar. 3, 2004    (KR) ..................... 10-2004-0014436

(51) Int. Cl.
*G06F 17/60*    (2006.01)
(52) U.S. Cl. ..................... 235/379; 235/376
(58) Field of Classification Search ................ 235/379, 235/487, 375, 376; 715/526, 851, 853; 707/1; 345/581, 629, 1.1, 9; 524/108; 549/364
See application file for complete search history.

(56) References Cited

U.S. PATENT DOCUMENTS

| | | | | |
|---|---|---|---|---|
| 5,832,471 A * | 11/1998 | Fukui | ............................ | 707/1 |
| 5,949,432 A * | 9/1999 | Gough et al. | ................ | 345/629 |
| 6,253,218 B1 * | 6/2001 | Aoki et al. | ................. | 715/526 |
| 6,262,724 B1 * | 7/2001 | Crow et al. | ................. | 715/723 |
| 6,384,840 B1 * | 5/2002 | Frank et al. | ................ | 345/634 |
| 6,597,378 B1 * | 7/2003 | Shiraishi et al. | ............ | 715/764 |
| 6,629,635 B1 * | 10/2003 | Akamine | .................... | 235/375 |
| 6,636,250 B1 * | 10/2003 | Gasser | ........................ | 715/853 |
| 6,683,630 B1 * | 1/2004 | Shoff et al. | .................. | 715/805 |
| 6,751,604 B2 * | 6/2004 | Barney et al. | ................. | 707/1 |
| 6,863,214 B2 * | 3/2005 | Garner et al. | ............... | 235/379 |
| 6,968,502 B1 * | 11/2005 | Kubomura et al. | ......... | 715/520 |
| 7,168,048 B1 * | 1/2007 | Goossen et al. | ............ | 715/797 |
| 2002/0091709 A1 * | 7/2002 | Jung | ....................... | 707/104.1 |
| 2004/0034775 A1 * | 2/2004 | Desjardins et al. | ......... | 713/170 |
| 2005/0052341 A1 * | 3/2005 | Henriksson | .................... | 345/4 |
| 2005/0264589 A1 * | 12/2005 | Kimoto et al. | .............. | 345/698 |

FOREIGN PATENT DOCUMENTS

JP          2002328829 A   * 11/2002

* cited by examiner

*Primary Examiner*—Thien M. Le
*Assistant Examiner*—Edwyn Labaze
(74) *Attorney, Agent, or Firm*—The Farrell Law Firm

(57) ABSTRACT

A data displaying apparatus that can efficiently display a plurality of data on a relatively small display screen. The data displaying apparatus includes a user input unit for outputting a data display request signal if there is a data display request from a user, a memory unit for storing a plurality of data and a plurality of identification information corresponding respectively thereto, a display unit, and a controller. The controller controls the display unit to display the plurality of data. Also, the controller controls the display unit to display the plurality of identification information if the data display request signal is inputted, display data corresponding to specific identification information via a first layer if the specific identification information is selected from among the plurality of identification information, and enlargedly display a specific area of the specific information via a second layer if the specific area is selected from the specific identification information via the first layer.

17 Claims, 6 Drawing Sheets

DATA DISPLAYING APPARATUS AND METHOD

PRIORITY

This application claims priority to an application entitled "DATA DISPLAYING APPARATUS AND METHOD", filed in the Korean Intellectual Property Office on Mar. 3, 2004 and assigned Serial No. 2004-14436, the contents of which are hereby incorporated herein by reference.

BACKGROUND OF THE INVENTION

1. Field of the Invention

The present invention relates to a data-displaying apparatus and method, and more particularly to a data-displaying apparatus and method for efficiently displaying a plurality of data on a relatively small-sized display screen.

2. Description of the Related Art

As science and technology advance, various kinds of personal terminals such as a mobile communication terminals, PDAs (Personal Digital Assistant) and the like (e.g., PALM™ PILOTS) have appeared on the market. Such personal terminals are relatively small so that users of the personal terminals can easily carry them and compute and send, and receive various information therethrough. The display screens of many existing personal terminals are necessarily small because the personal terminals are themselves small. Moreover, these small display screens are usually incapable of simultaneously displaying a plurality of data thereon, and, if they do, the display of the data is unduly compressed. Therefore, the prior art personal terminal having a small sized display screen has the disadvantage of not being able to efficiently display a plurality of data thereon.

SUMMARY OF THE INVENTION

It is an object of the present invention to provide a data displaying apparatus and method for efficiently displaying a plurality of identification information data, such as, icons, filenames, file directories, pictures, etc. on a small display screen if there is a data-display request from a user, and providing information corresponding to the data-display request to the user therethrough.

It is another object of the present invention to provide a data-display apparatus and method for displaying a plurality of identification information corresponding respectively to a plurality of data on a small display screen and if there is a data-display request from a user, translucently displaying data corresponding to a specific one of the plurality of identification information if the specific identification information is selected from among the plurality of identification information, enlarging a specific area of the translucently displayed data if the specific area is selected from among the translucently displayed data, and displaying the enlarged specific area, so that the user can easily see the plurality of data.

In accordance with an aspect of the present invention, the above and other objects can be accomplished by the provision of a data displaying apparatus and method including a user input unit for outputting a data display request signal if there is a data-display request from a user, a memory unit for storing a plurality of data and a plurality of identification information corresponding respectively thereto, a display unit for displaying the plurality of data, and a controller for controlling the display unit to display the plurality of identification information if the data-display request signal is inputted by the user input unit at the request of the user, displaying data corresponding to specific identification information displayed via a first layer if the specific identification information is selected from among the plurality of identification information, and displaying in an enlarged form a specific area of the desired specific information of the first layer via a second layer if the specific area is selected from the specific identification information of the first layer.

In accordance with another aspect of the present invention, there is provided a data displaying method including displaying a plurality of identification information corresponding respectively to a plurality of data if a data-display request signal is inputted by a user, displaying specific data corresponding to a specific one of the plurality of identification information via a first layer if the specific identification information is selected from the plurality of identification information, and displaying a specific area of the specific data via a second layer if the specific area is selected from the specific data displayed via the first layer, wherein the second layer enlarges the specific area.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the annexed drawings. In the following description, a detailed description of known functions and configurations incorporated herein will be omitted when it may make the subject matter of the present invention unclear.

Figure 1:
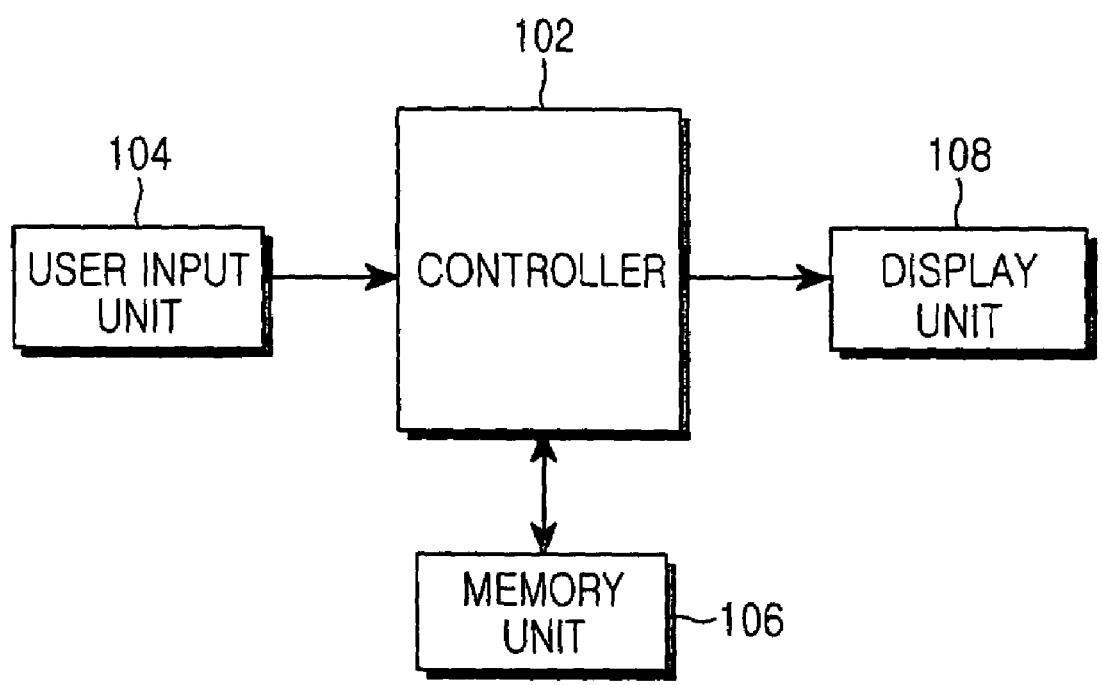
FIG. 1 is a block diagram showing a data displaying apparatus according to an embodiment of the present invention.

FIG. 1 is a block diagram showing a data displaying apparatus according to an embodiment of the present invention. The data displaying apparatus comprises a controller 102, a user input unit 104, a memory unit 106 and a display unit 108.

The controller 102 controls each element of the data displaying apparatus. Namely, the controller 102 controls the display unit 108 to display a plurality of identification information corresponding respectively to a plurality of data if there is a data-display request signal from a user. Moreover, if specific identification information is selected from among the plurality of identification information, the controller 102 controls the display unit 108 to display data corresponding to the specific identification information via a first layer thereon. Additionally, if a specific area is selected by the user from among the data displayed in the first layer, the controller 102 controls the display unit 108 to display in an enlarged form the specific area via a second layer.

The user input unit 104 may be implemented with, for example, a touch panel, a keypad, or other known user input system or methods to output a signal corresponding to a touch or key input from a user. For example, if there is a touch or key input from the user corresponding to a data display request, the user input unit 104 outputs a data-display request signal.

The memory unit 106 includes a ROM (Read-Only Memory) for storing an operation program, an EEPROM (Electrically Erasable Programmable ROM) and a RAM (Random Access Memory). The memory unit 106 stores a plurality of data and a plurality of identification information corresponding respectively thereto. Here, each of the plurality of identification information may be visually displayed by an icon, picture, a file name, a folder name, or other visual element.

The display unit 108 can be implemented with, for example, a LCD (Liquid Crystal Display) device or other suitable display device. The display unit displays a plurality of data as determined by the controller 102. For example, when commanded to do so by the controller 102, the display unit displays a plurality of identification information which corresponds respectively to the plurality of data which corresponds to specific identification information via a first layer and a specific area of the specific information displayed in the first layer via a second layer. Here, the specific area is displayed in enlarged form in the second layer.

Figure 2:
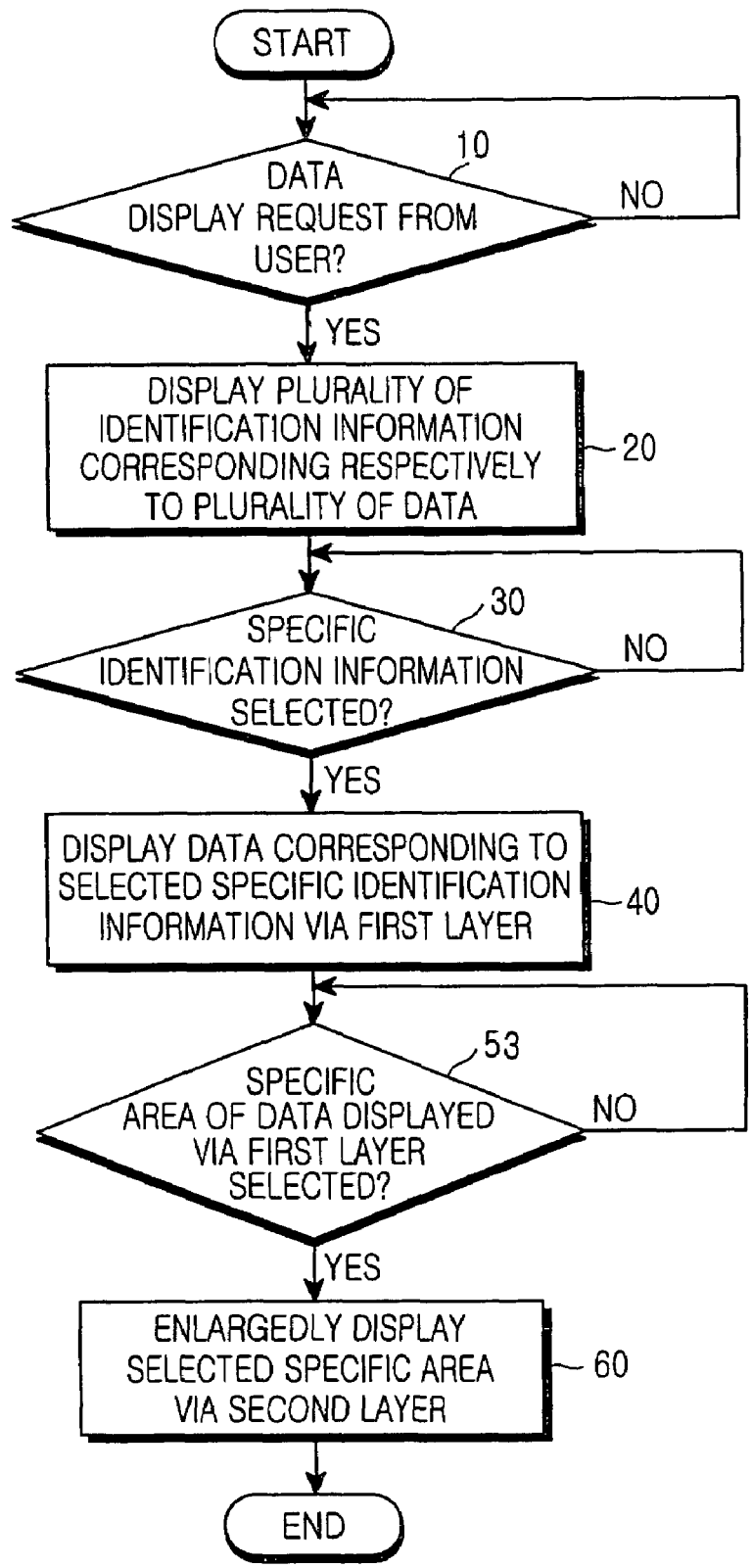
FIG. 2 is a flow chart illustrating a data displaying method according to an embodiment of the present invention.

FIG. 2 is a flow chart illustrating a data displaying method according to an embodiment of the present invention.

Figure 3A:
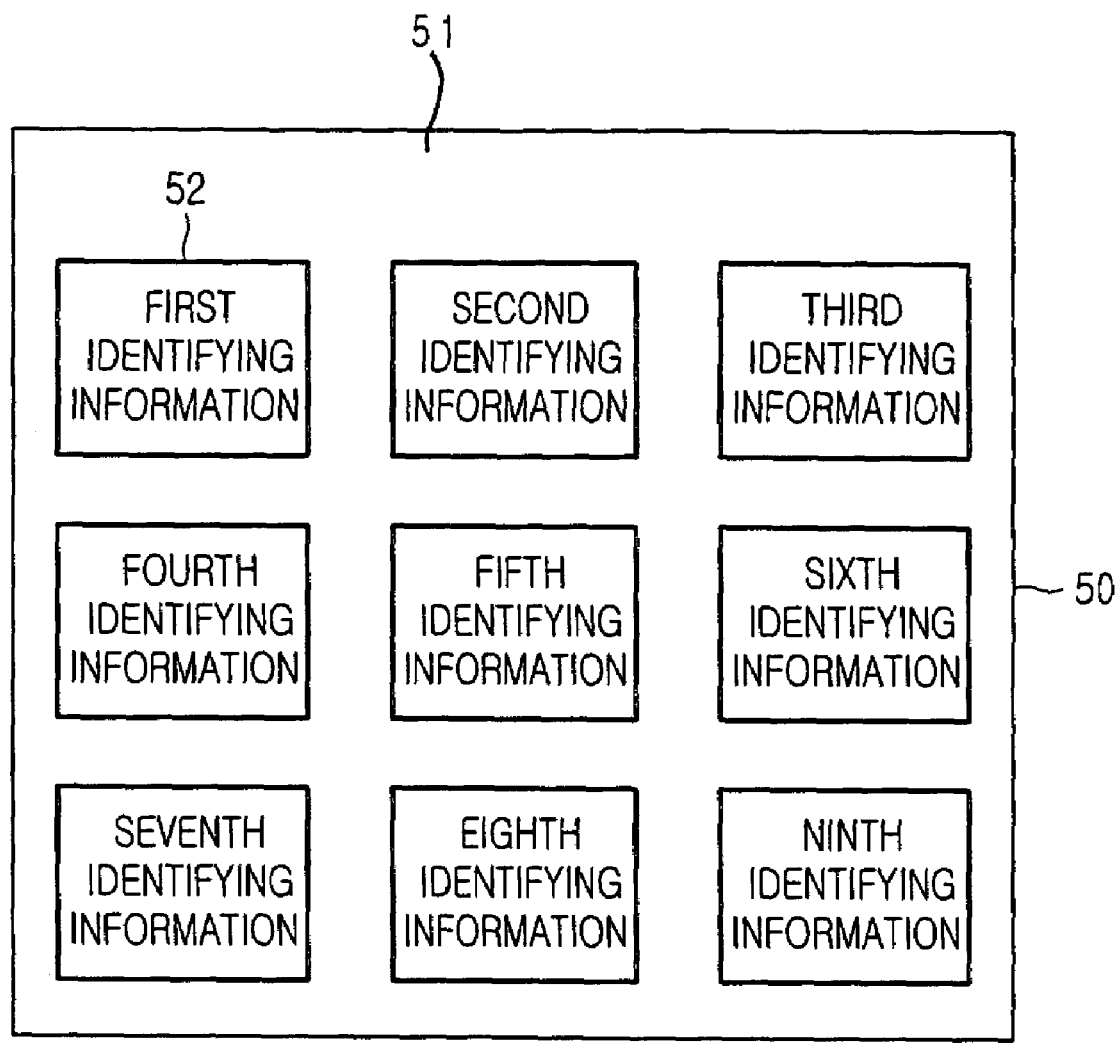
FIG. 3A is a view illustrating a base layer window showing specific identification information.
Figure 4:
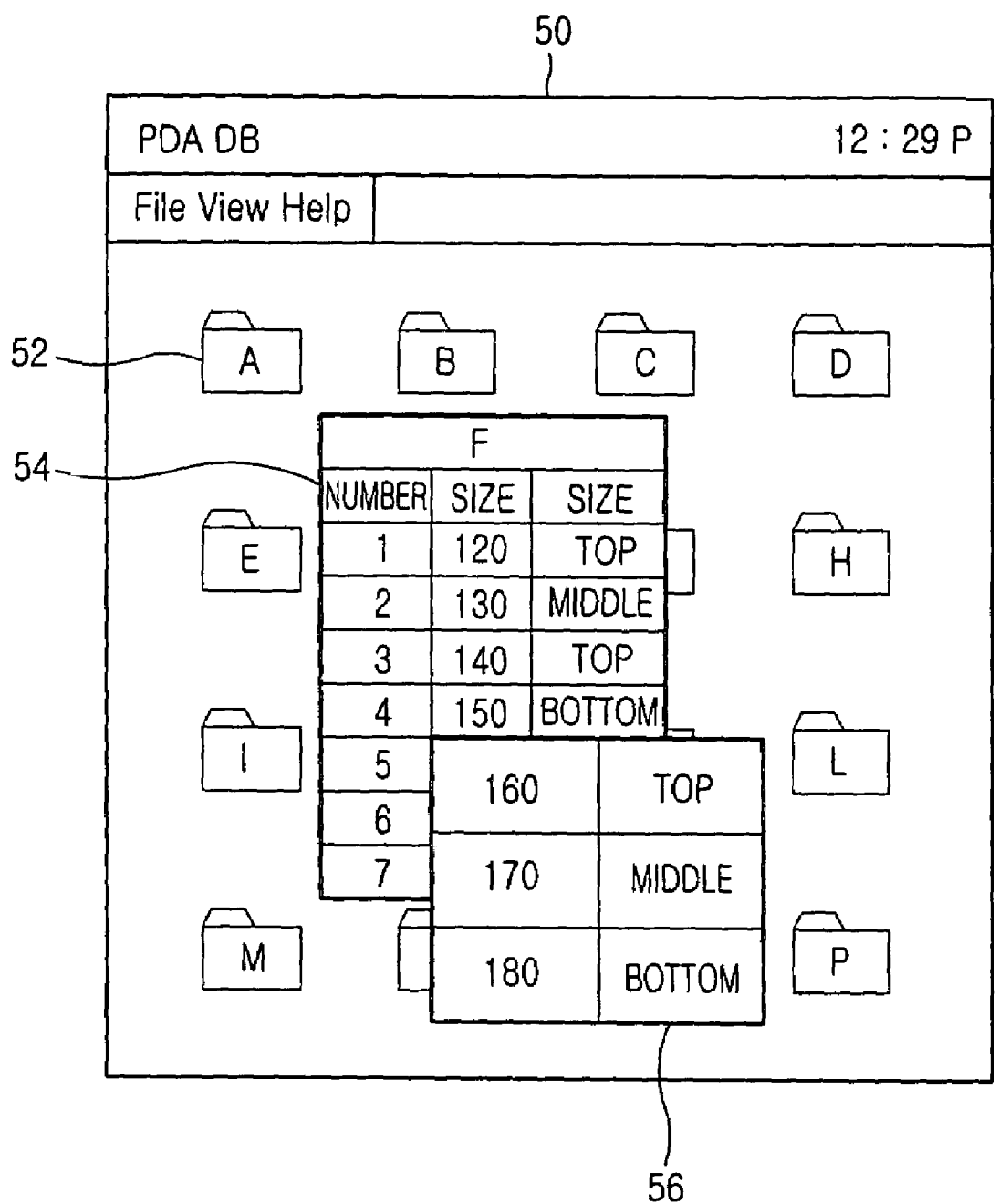
FIG. 4 is a view illustrating an exemplary data display screen shot according to the embodiment of the present invention.

At step 10, the controller 102 determines whether there is a data-display request from a user. If there is the data-display request via the user input unit 104, the controller 102 controls the display unit 108 to display a plurality of identification information corresponding respectively to a plurality of data stored in the memory unit 106, at step 20. For example, with reference to FIG. 3A, the controller 102 controls the display unit 108 to display the plurality of identification information such as first to ninth identification information on a user interface screen 50 as shown in FIG. 4. Here, each of the plurality of identification information may be implemented with an icon, a file name, a folder name, etc.

Figure 3B:
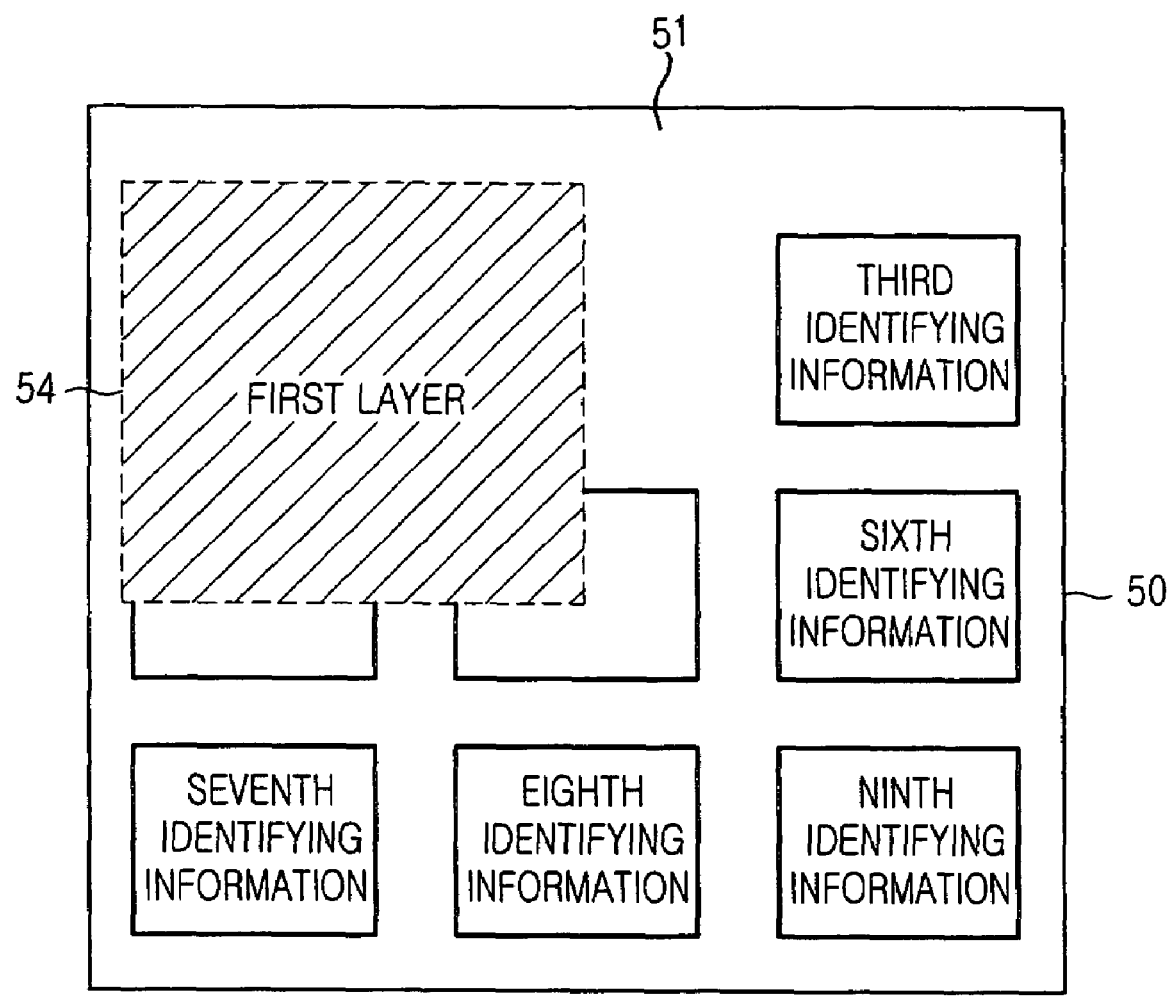
FIGS. 3B and 3C are views illustrating first and second layers superimposed upon a base layer window showing specific identification information according to an embodiment of the present invention.

After the display unit displays the plurality of identification information (in the base layer 51), the controller 102 determines whether specific identification information is selected from the plurality of identification information, at step 30. If the specific identification information is selected, the controller 102 controls the display unit 108 to display data corresponding to the selected specific identification information via a first layer, at step 40. If first identification information 52, (as shown in FIG. 3A) is selected from among first to ninth identification information, the controller 102 controls the display unit 108 to display data corresponding thereto via a first layer 54, as shown in FIG. 3B. Here, the corresponding data is translucently displayed via the first layer 54 which is superimposed upon the base layer 51.

Figure 3C:
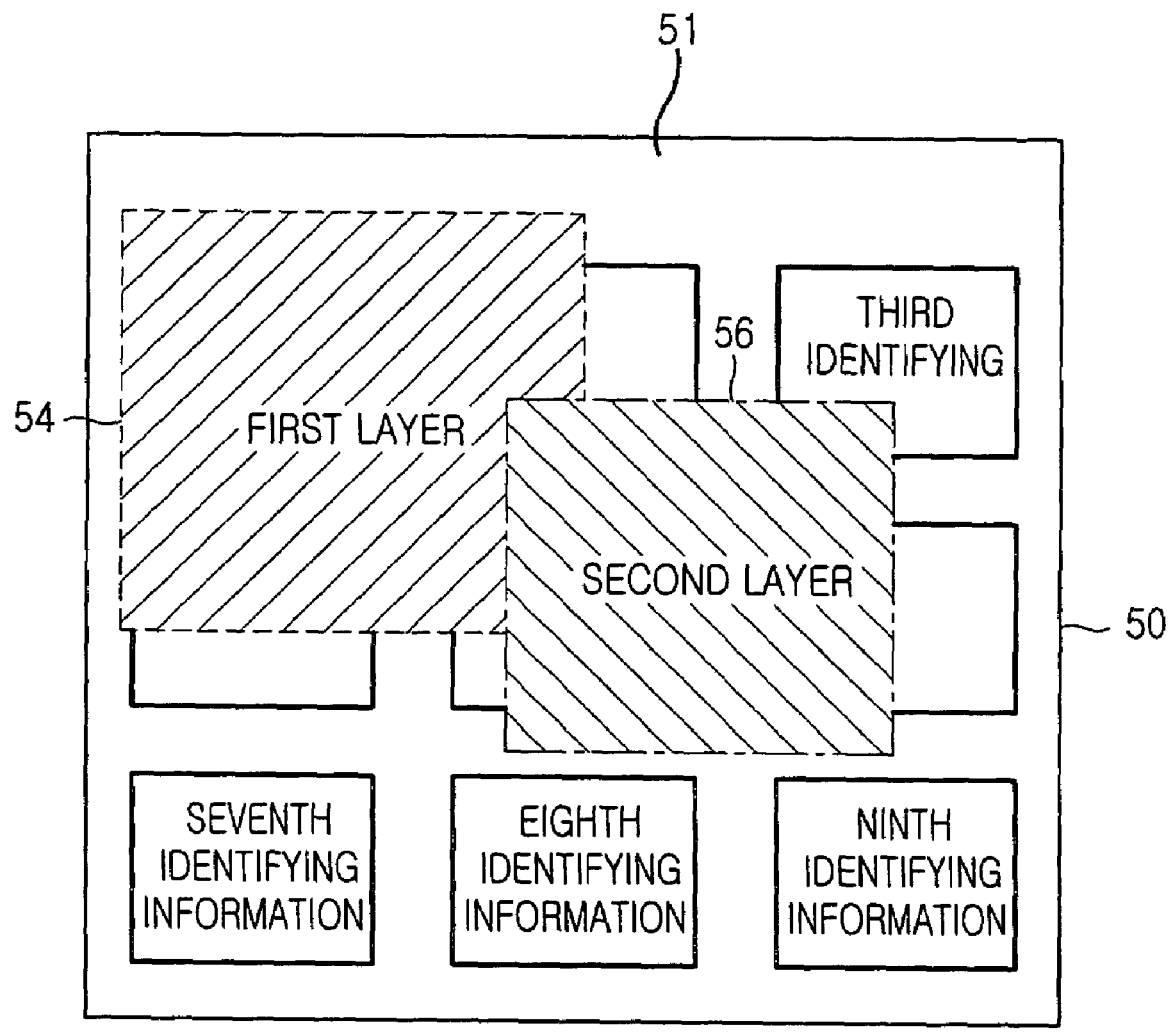

After displaying the corresponding data, the controller 102, at step 53, determines whether a specific area of the first layer 54 is selected by the user. If the specific area is selected from the data displayed via the first layer 54, the controller 102 controls the display unit 108 to enlarge and display the selected specific area via a second layer 56, at step 60. For example, as shown in FIG. 3C, if a specific area of the first layer 54 is selected, the controller 102 controls the display unit 108 to display the second layer 56 enlarging the selected specific area, overlapping the first layer 54.

FIG. 4 is a view illustrating an exemplary screen shot of the display according to an embodiment of the present invention. The data display screen shot is an example of a PDADB (Personal Digital Assistant Data Base) screen 50. As applied to a PDA, a data displaying method will be described in detailed below. If there is a data-display request from a user, the PDA displays folder names A to P on the (base layer) PDADB screen 50. Here, each of the folders 52, displayed with the letters A to P, indicates a plurality of identification information corresponding respectively to a plurality of data. For example, if folder F is selected from among the folders, the PDA displays data corresponding to identification information indicated by the folder F via a first layer 54. Here, the first layer 54 is translucently displayed upon the base layer. Also, if a specific area is selected among the corresponding data displayed via the first layer 54, the PDA displays a second layer 56 enlarging the selected specific area on the first layer 54.

As described above, the data displaying apparatus and method according to the present invention can efficiently display a plurality of data on a relatively small-sized display screen if there is a data-display request from a user. More specifically, the data displaying apparatus and method according to the present invention can display a plurality of identification information corresponding respectively to a plurality of data on a relatively small-sized display screen if there is a data-display request from a user. Also, if specific identification information is selected from among the plurality of identification information, the data displaying apparatus translucently displays data corresponding to the selected specific identification information on the relatively small-sized display screen. Further, if a specific area is selected from the translucently displayed data which is displayed in the first layer, the data displaying apparatus enlarges the specific area and displays it on the relatively small-sized display screen (i.e., the second layer). Accordingly, the user can easily see and interact with the plurality of data on the relatively small display screen.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A data displaying apparatus comprising:
   a user input unit for outputting a data-display request signal if there is a data-display request from a user;
   a memory unit for storing a plurality of data and a plurality of identification information corresponding to said plurality of data;
   a display unit for displaying the plurality of data; and
   a controller for controlling said display unit to display the plurality of identification information if said data display request signal is inputted by the user, display data corresponding to specific identification information via a first layer if the specific identification information is selected from among the plurality of identification information, and display a specific area of the specific information in an enlarged form via a second layer if the specific area is selected from the specific identification information of the first layer.

2. The data displaying apparatus as set forth in claim 1, wherein each of said plurality of identification information is an icon.

3. The data displaying apparatus as set forth in claim 2, wherein the first layer translucently displays the data corresponding to the specific identification information.

4. The data displaying apparatus as set forth in claim 1, wherein each of said plurality of identification information is a file name.

5. The data displaying apparatus as set forth in claim 4, wherein the first layer translucently displays the data corresponding to the specific identification information.

6. The data displaying apparatus as set forth in claim 1, wherein each of said plurality of identification information is a folder name.

7. The data displaying apparatus as set forth in claim 6, wherein the first layer translucently displays the data corresponding to the specific identification information.

8. The data displaying apparatus as set forth in claim 1, wherein the first layer translucently displays the data corresponding to the specific identification information.

9. A data displaying method comprising:
   displaying a plurality of identification information corresponding respectively to a plurality of data if a data-display request signal is inputted by a user;
   displaying specific data corresponding to a specific one of the plurality of identification information via a first layer if the specific identification information is selected from the plurality of identification information; and
   enlarging and displaying a specific area of the specific data of the first layer via a second layer if the specific area is selected from the specific data displayed via the first layer, wherein the second layer enlarges the specific area.

10. The data displaying method as set forth in claim 9, wherein each of the plurality of identification information is an icon.

11. The data displaying method as set forth in claim 10, wherein the first layer translucently displays the data corresponding to the specific identification information.

12. The data displaying method as set forth in claim 9, wherein each of the plurality of identification information is a file name.

13. The data displaying method as set forth in claim 12, wherein the first layer translucently displays the data corresponding to the specific identification information.

14. The data displaying method as set forth in claim 9, wherein each of the plurality of identification information is a folder name.

15. The data displaying method as set forth in claim 14, wherein the first layer translucently displays the data corresponding to the specific identification information.

16. The data displaying method as set forth in claim 9, wherein the first layer translucently displays the data corresponding to the specific identification information.

17. A data displaying apparatus comprising:
   a user input unit for outputting a data-display request signal if there is a data display request from a user;
   a memory unit for storing a plurality of data and a plurality of identification information corresponding to said plurality of data;
   a display unit for displaying the plurality of data; and
   a controller for controlling said display unit in response to the data-display request by the user to display the plurality of identification information, said display unit further displaying data corresponding to specific identification information via a first layer if the specific identification information is selected from among the plurality of identification information, and displaying a specific area of the specific information in an enlarged form via a second layer if the specific area is selected from the specific identification information of the first layer.

* * * * *